(12) United States Patent
Cohen

(10) Patent No.: US 6,870,810 B1
(45) Date of Patent: Mar. 22, 2005

(54) APPARATUS AND METHOD FOR MANAGING NETWORK CONGESTION

(75) Inventor: Reuven Cohen, Haifa (IL)

(73) Assignee: ECI Telecom Ltd., Petach Tikva (IL)

( * ) Notice: Subject to any disclaimer, the term of this patent is extended or adjusted under 35 U.S.C. 154(b) by 0 days.

(21) Appl. No.: 09/554,840

(22) PCT Filed: Nov. 20, 1998

(86) PCT No.: PCT/IL98/00569

§ 371 (c)(1),
(2), (4) Date: Jun. 26, 2000

(87) PCT Pub. No.: WO99/27464

PCT Pub. Date: Jun. 3, 1999

(30) Foreign Application Priority Data

Nov. 21, 1997 (IL) ................................................ 122271

(51) Int. Cl.[7] .............................. H04J 1/16; H04J 3/14
(52) U.S. Cl. ...................... 370/229; 370/236; 370/230; 370/235
(58) Field of Search ............................ 370/236, 295.2, 370/229, 230, 230.1, 231, 232, 233, 234, 235; 709/200, 230, 232, 235

(56) References Cited

U.S. PATENT DOCUMENTS

| 5,140,584 | A |   | 8/1992  | Suzuki          |         |
|-----------|---|---|---------|-----------------|---------|
| 5,335,222 | A | * | 8/1994  | Kamoi et al.    | 370/230 |
| 5,390,299 | A |   | 2/1995  | Rege et al.     |         |
| 5,838,677 | A |   | 11/1998 | Kozaki et al.   |         |
| 5,914,936 | A | * | 6/1999  | Hatono et al.   | 370/230 |
| 6,034,945 | A | * | 3/2000  | Hughes et al.   | 370/230 |
| 6,167,027 | A | * | 12/2000 | Aubert et al.   | 370/230 |
| 6,229,789 | B1 | * | 5/2001 | Simpson et al.  | 370/235 |

FOREIGN PATENT DOCUMENTS

| EP | 0 744 850 | 11/1996 |
|----|-----------|---------|
| WO | 96 39763  | 12/1996 |

OTHER PUBLICATIONS http://whatis.com/atm.htm printout, "ATM", printed Sep. 21, 1997.
http://whatis.com/atm.htm printout, "packet", Sep. 21, 1997.
Armitage et al., "Packet Reassembly During Cell Loss," IEEE NETWORK, Sep. 1993, pp. 26–34.
Turner, J., "Maintaining High Throughput During Overload in ATM Switches," IEEE, 1996, pp. 287–295.
Romanow et al., "Dynamics of TCP Traffic Over ATM Networks," IEEE, 1995, PP. 633–641.

* cited by examiner

Primary Examiner—Ajit Patel
(74) Attorney, Agent, or Firm—Browdy and Neimark, P.L.L.C.

(57) ABSTRACT

A method for managing congestion on a network, the method including establishing a buffer (20) threshold bounding a first and a second buffer region (22, 24, 26), maintaining a rejection indicator for each of a plurality of network connections (24), and preventing the buffering (26) of a transmission bound for a first of the plurality of network connections if the buffer threshold is exceeded.

26 Claims, 7 Drawing Sheets

APPARATUS AND METHOD FOR MANAGING NETWORK CONGESTION

CROSS REFERENCE TO RELATED APPLICATION

The present application is the national stage under 35 U.S.C. 371 of PCT/IL98/00569, filed 20 Nov. 1998.

FIELD OF THE INVENTION

The present invention relates to computer networks in general, and in particular to methods and apparatus for managing computer network congestion.

BACKGROUND OF THE INVENTION

Various methods for managing computer network congestion are known in the art. However, many investigators have noted that packet-switching protocols such as TCP perform worse over cell-switched networks such as ATM networks than they do over packet-switched networks despite the application of a variety of congestion management techniques. The effective throughput, or "goodput" (namely throughput that is "good" for the higher layer protocol), of TCP over ATM can be very low when TCP packet cells are dropped by congested ATM switches over which TCP connections are established. This is due to the fact that while the loss of a single cell corrupts an entire packet, the rest of the cells belonging to the same corrupted packet are not necessarily dropped. These cells continue to consume network resources such as bandwidth and buffer space, unnecessarily increasing the chance that other cells may be dropped.

In order to solve this problem and to maximize the number of completely delivered packets by avoiding the transmission of useless cells, two control mechanisms have been proposed, namely PPD, or partial packet discard (also referred to as TPD, or "tail packet discard"), and EPD, or "early packet discard." In PPD, whenever a cell has been discarded by a switch due to congestion or for any other reason, the subsequent cells belonging to the same higher layer packet, except the last cell, are intentionally discarded. The last cell is needed in an ATM network supporting ATM adaptation layer 5 (AAL-5) where it is used to separate one packet from the next over the same virtual channel (VC). The PPD mechanism thus conserves the bandwidth and buffer space other wise required for routing the "tail" cells of the packet. However, it cannot conserve the bandwidth and buffer space already used for the "leading" cells, which may have already been buffered and transmitted. EPD is designed to prevent the leading cells of a packet in which a cell is dropped from being buffered and transmitted. This is done by setting a buffer threshold and testing the threshold to determine whether or not there is room in the buffer for the entire packet before buffering any packet cells. If the threshold is exceeded, all of the cells in the packet are dropped except for the last cell.

A TCP packet loss can be detected by the sending device by detecting a time-out or by receiving 3 duplicate acknowledgments (ACKs). The sending device maintains an estimate of the maximum round-trip time of the connection. When an ACK for a packet has not arrived within the maximum round-trip time, the sending device detects the packet loss and re-transmits the lost packet. The time during which the sending device waits for an ACK of a lost packet to arrive is referred to as a time-out. Most commercial TCP implementations set the time-out to be at least 2–3 seconds. Since typical data transfer times range from tens of milliseconds to several seconds, even a single time-out during the lifetime of a TCP connection results in significant performance degradation.

A fast retransmit method has been developed to avoid time-outs. Since the receiving device acknowledges the highest in-order packet sequence number it has received so far, when it receives an out-of-order packet (due to a loss of a previous packet) it generates an ACK for the same highest in-order sequence number. Such an ACK is referred to as a duplicate ACK. Under the fast retransmit method, when the sending device receives three duplicate ACKS, the sending device considers the packet, which starts with the sequence number immediately after the number acknowledged by the duplicate ACKs, to be lost. Hence, the presumed missing packet is immediately retransmitted.

Fast retransmit helps to minimize the recovery delay from a loss of a single packet if the TCP sending window size is large enough (i.e., larger than 4 packets). However, if for a given TCP connection two or more packets belonging to the same window are lost, the sending device can usually recover from only the first packet loss using fast retransmit, whereas recovery from other losses generally only occurs after a time-out. Hence, for a given TCP connection a burst of losses has a very negative effect on the connection's throughput. While PPD and EPD may conserve network resources for a given packet in which a cell is dropped, they offer no mechanism for maximizing network throughput by reducing the number of packets lost in a given TCP sending window for a given TCP connection.

Relevant methods useful in managing computer network congestion are discussed in the following:

G. Armitage and K. Adams, "Packet Reassembly During Cell Loss", *IEEE Network Mag*, Vol. 7 No. 5 September 1993, pp. 26–34;

A. Romanow and S. Floyd, "Dynamics of TCP Traffic over ATM Networks", IEEE Journal on Selected Areas in Communications, May 1995; and J. Turner, "Maintaining High Throughput During Overload in ATM Switches", *Proceedings of IEEE Infocom '96*. San Francisco, March 1996.

The disclosures of the above publications and of the publications cited therein are hereby incorporated by reference. The disclosures of all publications mentioned in this specification and of the publications cited therein are hereby incorporated by reference.

SUMMARY OF THE INVENTION

The present invention seeks to provide novel methods and apparatus for managing network congestion which overcome disadvantages of the prior art as discussed above. A mechanism referred to herein as BPD or "balanced packet discard" is provided for maximizing the total throughput of multiple TCP or other packet-switched connections sharing a common buffer space in an ATM or other cell-switching switch. This is achieved by minimizing the probability that a TCP connection will encounter a time-out. More specifically, when a packet of some connection is discarded, e.g., as a result of EPD or PPD mechanisms being invoked, the affected connection is given priority over other connections sharing the same buffer space. The purpose of this priority is to avoid subsequent packet loss by the same connection by discarding packets of other connections, even if such discarding would not otherwise be required under PPD or EPD mechanisms. BPD thus spreads the effects of network congestion more evenly across multiple connections to improve the chances for recovery for each individual connection.

There is thus provided in accordance with a preferred embodiment of the present invention a method for managing congestion on a network, the method including establishing a buffer threshold bounding a first and a second buffer region, maintaining a rejection indicator for each of a plurality of network connections, and preventing the buffering of a transmission bound for a first of the plurality of network connections if the buffer threshold is exceeded, the rejection indicator of the first of the plurality of network connections indicates that no transmission bound for the first of the plurality of network connections was previously rejected since the threshold last became exceeded, and the rejection indicator of any other of the plurality of network connections indicates that a transmission bound for the other of the plurality of network connections was previously rejected since the threshold last became exceeded.

Further in accordance with a preferred embodiment of the present invention the method includes rejecting the transmission bound for the first of the plurality of network connections.

Still further in accordance with a preferred embodiment of the present invention the method includes setting the rejection indicator of the first of the plurality of network connections to indicate that the transmission bound for the first of the plurality of network connections has been rejected.

Further in accordance with a preferred embodiment of the present invention the method further includes counting the number of times that transmission buffering is performed for the first of the plurality of network connections subsequent to the setting of the rejection indicator of the first of the plurality of network connections, and setting the rejection indicator of the first of the plurality of network connections to indicate that no transmission has been rejected once the counting equals a predetermined value.

Additionally in accordance with a preferred embodiment of the present invention the method includes setting any of the rejection indicators to indicate that no transmission has been rejected, the resetting occurs when the threshold is no longer exceeded.

There is also provided in accordance with a preferred embodiment of the present invention a method for managing congestion on a network, the method including maintaining a maximum buffer allocation for each of a plurality of network connections, maintaining a rejection indicator for each of the plurality of network connections, increasing the maximum buffer allocation for a first of the plurality of network connections, and decreasing the maximum buffer allocation for at least a second of the plurality of network connections, the increasing and decreasing occur when the rejection indicator of the first of the plurality of network connections indicates that a transmission bound for the first of the plurality of network connections was previously rejected, and the rejection indicator of the second of the plurality of network connections indicates that no transmission bound for the second of the plurality of network connections was previously rejected.

Further in accordance with a preferred embodiment of the present invention an aggregate of the increasing is substantially proportionate to an aggregate of the decreasing.

Still further in accordance with a preferred embodiment of the present invention the method includes establishing a buffer threshold bounding a first and a second buffer region for each of the plurality of network connections, maintaining a current buffer allocation for each of the plurality of network connections, and performing the increasing and decreasing steps when the current buffer allocation of the first of the plurality of network connections exceeds the buffer threshold of the first of the plurality of network connections.

Additionally in accordance with a preferred embodiment of the present invention the method includes rejecting a transmission bound for the first of the plurality of network connections.

Moreover in accordance with a preferred embodiment of the present invention the method includes setting the first rejection indicator to indicate that the transmission bound for the first of the plurality of network connections has been rejected.

Further in accordance with a preferred embodiment of the present invention the method includes setting any of the rejection indicators to indicate that no transmission has been rejected, the resetting occurs when all of the rejection indicators indicate that a transmission has been rejected.

There is also provided in accordance with a preferred embodiment of the present invention network congestion management apparatus including a network switch connectable with a plurality of network connections and including a buffer having a first and a second buffer region, a threshold indicator for monitoring a threshold intermediate the first and second buffer regions, and a rejection indicator for each of the plurality of network connections, the network switch is operative to prevent the buffering of a transmission bound for a first of the plurality of network connections if the threshold indicator indicates that the threshold is exceeded, the rejection indicator of the first of the plurality of network connections indicates that no transmission bound for the first of the plurality of network connections was previously rejected since the threshold last became exceeded, and the rejection indicator of any other of the plurality of network connections indicates that a transmission bound for the other of the plurality of network connections was previously rejected since the threshold last became exceeded.

Further in accordance with a preferred embodiment of the present invention the network switch is further operative to reject the transmission bound for the first of the plurality of network connections.

Still further in accordance with a preferred embodiment of the present invention the network switch is further operative to set the rejection indicator of the first of the plurality of network connections to indicate that the transmission bound for the first of the plurality of network connections has been rejected.

Moreover in accordance with a preferred embodiment of the present invention the network switch is further operative to count the number of times that transmission buffering is performed for the first of the plurality of network connections subsequent to the setting of the rejection indicator of the first of the plurality of network connections and set the rejection indicator of the first of the plurality of network connections to indicate that no transmission has been rejected once the counting equals a predetermined value.

Additionally in accordance with a preferred embodiment of the present invention the network switch is further operative to set any of the rejection indicators to indicate that no transmission has been rejected, the resetting occurs when the threshold is no longer exceeded.

There is also in accordance with a preferred embodiment of the present invention network congestion management apparatus including a network switch connectable with a plurality of network connections and including a buffer for each of the plurality of network connections, each of the plurality of network connections having a maximum buffer allocation, and a rejection indicator for each of the plurality of network connections, the network switch is operative to increase the maximum buffer allocation for a first of the plurality of network connections, and decrease the maximum buffer allocation for at least a second of the plurality of network connections, the increasing and decreasing occur when the rejection indicator of the first of the plurality of network connections indicates that a transmission bound for the first of the plurality of network connections was previously rejected and the rejection indicator of the second of the plurality of network connections indicates that no transmission bound for the second of the plurality of network connections was previously rejected.

Further in accordance with a preferred embodiment of the present invention the network switch is further operative to increase the maximum buffer allocation for the first of the plurality of network connections in a manner that is substantially proportionate to an aggregate decrease of the maximum buffer allocation of the at least second of the plurality of network connections.

Still further in accordance with a preferred embodiment of the present invention the network switch further includes a threshold indicator for monitoring a threshold intermediate a first and a second buffer region for each of the buffers, each of the plurality of network connections having a current buffer allocation, and a rejection indicator for each of the plurality of network connections, the network switch is additionally operative to adjust any of the maximum buffer allocations when the threshold indicator indicates that the current buffer allocation of the first of the plurality of network connections exceeds the threshold of the first of the plurality of network connections.

Additionally in accordance with a preferred embodiment of the present invention the network switch is additionally operative to reject a transmission bound for the first of the plurality of network connections.

Moreover in accordance with a preferred embodiment of the present invention the network switch is additionally operative to set the first rejection indicator to indicate that the transmission bound for the first of the plurality of network connections has been rejected.

Further in accordance with a preferred embodiment of the present invention the network switch is additionally operative to set any of the rejection indicators to indicate that no transmission has been rejected, the resetting occurs when all of the rejection indicators indicate that a transmission has been rejected.

Still further in accordance with a preferred embodiment of the present invention the network is a packet-switched network and the transmissions therethrough include packets.

BRIEF DESCRIPTION OF THE DRAWINGS

The present invention will be understood and appreciated from the following detailed description, taken in conjunction with the drawings in which.

DETAILED DESCRIPTION OF PREFERRED EMBODIMENTS

Figure 1:
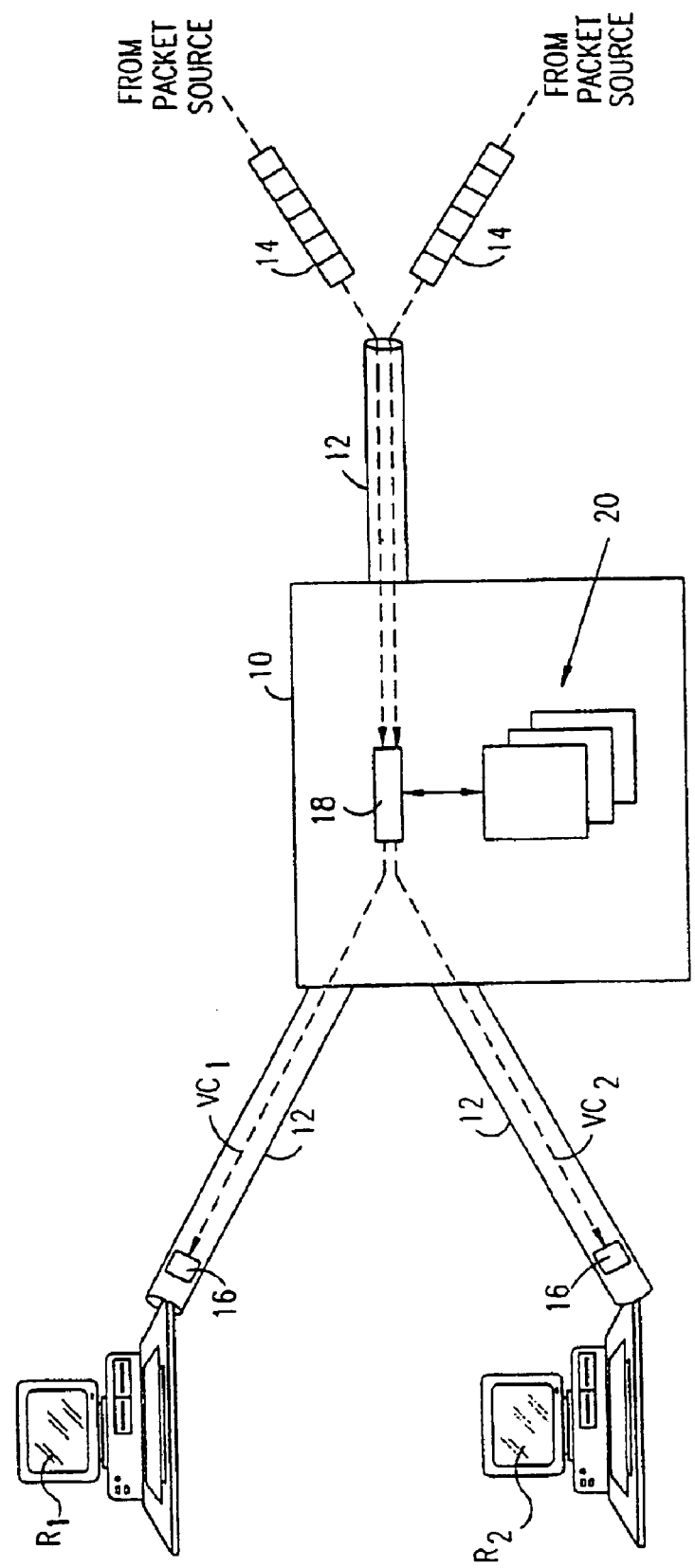
FIG. 1 is a simplified block diagram of a cell-switching network supporting a packet-switching protocol constructed and operative in accordance with a preferred embodiment of the present invention.

Reference is now made to FIG. 1 which is a simplified block diagram of a network, such as a cell-switching network supporting a packet-switching protocol, constructed and operative in accordance with a preferred embodiment of the present invention. A network switch 10, typically an ATM switch, is shown having one or more physical network connections 12 as is known. Switch 10 is preferably capable of receiving network transmissions including packet-switched traffic such as TCP packets 14 from one or more packet sources and providing cell-switched traffic such as ARM cells 16 over one or more logical network connections, herein referred to as virtual circuits, such as $VC_1$ and $VC_2$, to one or more receivers, such as $R_1$ and $R_2$. Switch 10 preferably comprises a processing and logic unit 18 for managing a buffer 20 which may be a single buffer or a buffer pool. Buffer 20 is typically shared by one or more virtual circuits, such as $VC_1$ and $VC_2$. While a single switch 10 is shown, it is appreciated that multiple switches, routers, and servers supporting packet-switching and cell-switching protocols as described herein may be employed as is known in the art.

Figure 2:
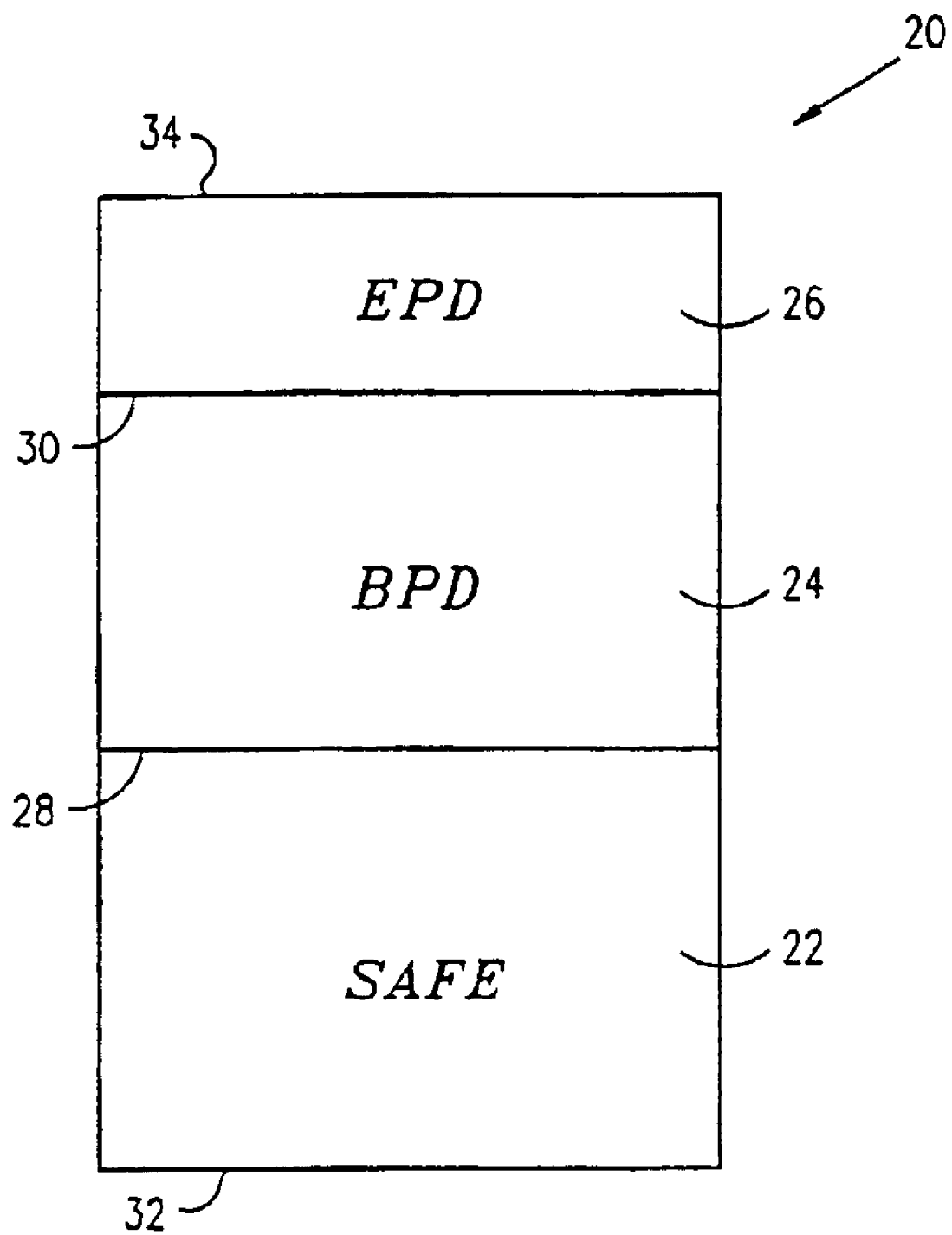
FIG. 2 is a simplified block diagram of a preferred implementation of buffer 20 of FIG. 1.

Reference is now additionally made to FIG. 2 which is a simplified block diagram of a preferred implementation of buffer 20 of FIG. 1 constructed and operative in accordance with a preferred embodiment of the present invention. Buffer 20 typically comprises a safe region 22 Ad and a BPD region 24. A region as referred to herein typically refers to a memory area as is known. Buffer 18 may additionally comprise an EPD region 26. A BPD threshold 28 is typically provided bounding the BPD and safe regions. Likewise, an EPD threshold 30 is typically provided bounding the BPD and EPD regions. It is a particular feature of the invention that buffer thresholds may be fixed or set dynamically to provide optimal levels of throughput Buffer 20 is typically bounded by a lower memory address 32 and an upper memory address 34 as is known.

Figure 3:
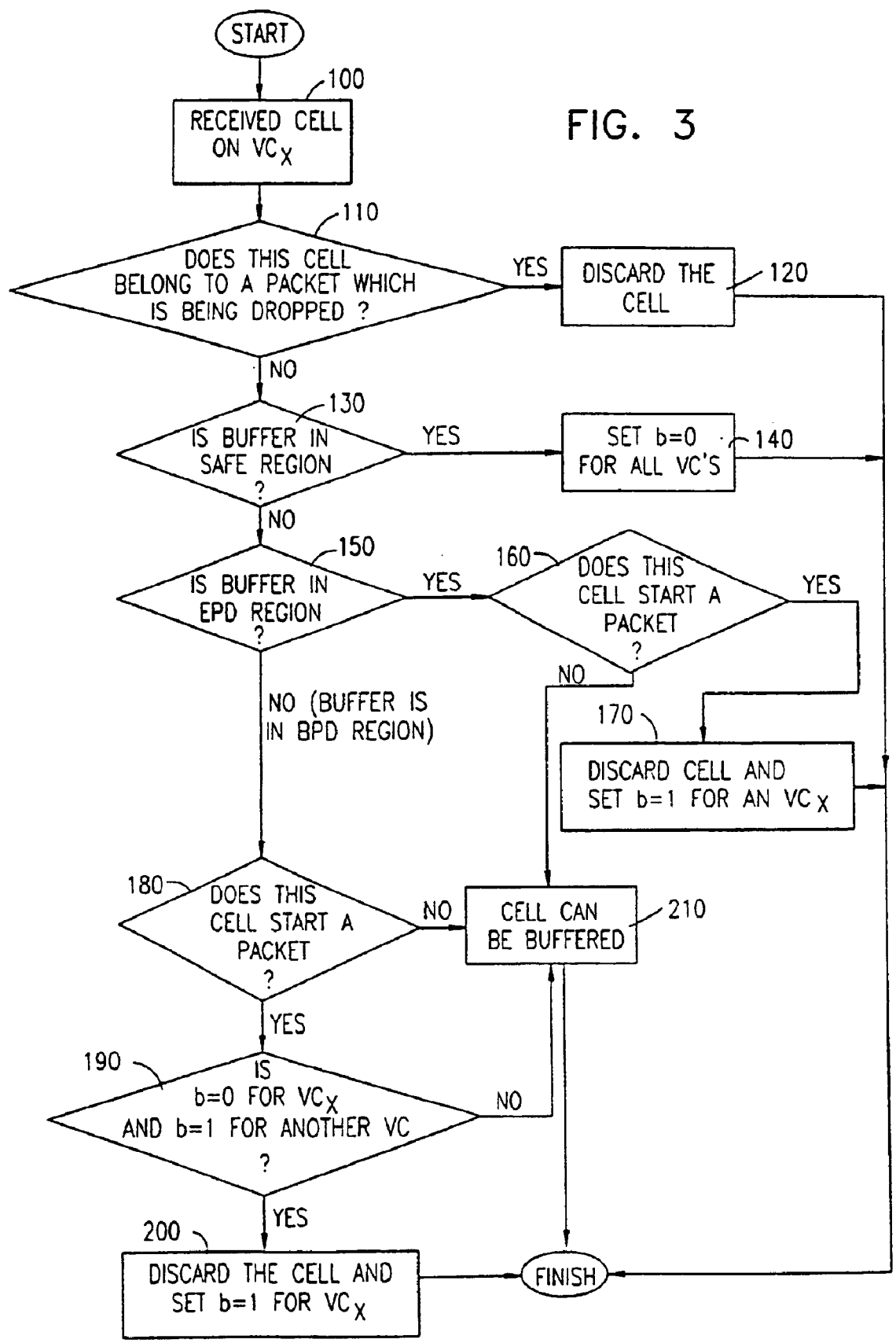
FIG. 3 is a simplified flowchart illustration of a preferred method of managing network congestion at buffer 20 of FIGS. 1 and 2 in accordance with a preferred embodiment of the present invention.

Reference is now additionally made to FIG. 3 which is a simplified flowchart illustration of a preferred method of managing network congestion at buffer 20 of FIGS. 1 and 2 constructed and operative in accordance with a preferred embodiment of the present invention. It is appreciated that the steps of the method of FIG. 3 and of other methods described herein need not necessarily be performed in a particular order, and that in fact, for reasons of implementation, a particular implementation of the method may be performed in a different order than another particular implementation. In the method of FIG. 3 a rejection indicator, herein referred to as "b" (for "balanced"), is typically maintained for all virtual circuits, such as $VC_1$ and $VC_2$, and is used to indicate the packet rejection status for each virtual circuit. A cell is received for a virtual circuit $VC_x$, typically as part of a TCP packet received at switch 10 (step 100). If the cell belongs to a corrupted packet or to a packet that is being dropped (step 110) then the cell is discarded (step 120). If the cell does not belong to a corrupted packet or to a packet that is being dropped, buffer 20 is checked to see if BPD threshold 28 is exceeded (step 130). If BPD threshold 28 is not exceeded, then the buffer is said to be in safe region 22. If the buffer is in the safe region, b is reset for each virtual circuit to indicate that no packets have been rejected for the virtual circuit, typically by setting b=0 (step 140). If BPD threshold 28 is exceeded (step 130) then buffer 20 is checked to see if EPD threshold 30 is exceeded (step 150). If EPD threshold 30 is exceeded, then the buffer is said to be in EPD region 26. If the buffer is in the EPD region, if the cell starts a new packet (step 160) then the cell is discarded and b is set for $VC_x$ to indicate that the packet to which the cell belongs is to be discarded, typically by setting b=1 (step 170). If the cell does not start a new packet (step 160) then the cell can be buffered (step 210). If after step 150 EPD threshold 30 is not exceeded, then the buffer is said to be in BPD region 24. If the cell starts a new packet (step 180), b is checked for the current virtual circuit $VC_x$ and for other virtual circuits. If b=0 for $VC_x$ and b=1 for any other virtual circuit (step 190), the cell is discarded and b is set for $VC_x$ to indicate that the packet to which the cell belongs is to be discarded, typically by setting b=1 (step 200). Otherwise, the cell is placed in buffer 20 (step 210). Buffered cells are subsequently transmitted in accordance with known ATM switching protocols and procedures.

Figure 4:
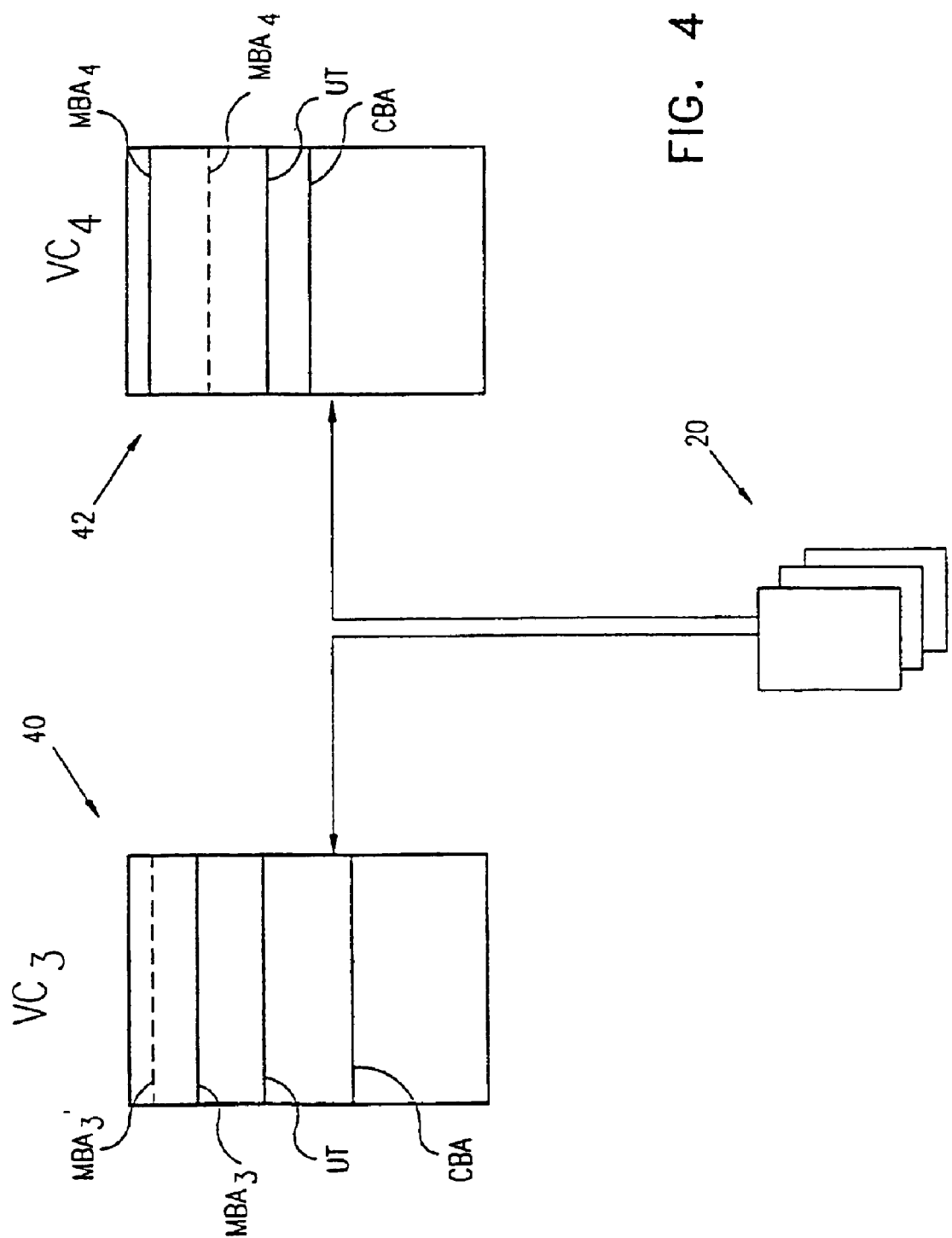
FIG. 4 is a simplified block diagram of another preferred implementation of buffer 20 of FIG. 1.

Reference is now made to FIG. 4 which is a simplified block diagram of another preferred implementation of buffer 20 of FIG. 1. Buffer 20 is shown being allocated to buffers 40 and 42 which represent separate buffers for virtual circuits $VC_3$ and $VC_4$ respectively, although buffer 20 may be allocated among any number of virtual circuits. Each buffer 40 and 42 preferably has a current buffer allocation (CBA) indicating the number of buffers currently in use by $VC_3$ and $VC_4$ respectively, an upper threshold (UT) indicating when EPD should be activated for each virtual circuit, and a maximum buffer allocation (MBA) indicating the maximum number of buffers that may be allocated to each virtual circuit, shown as $MBA_3$ and $MBA_4$ respectively. $MBA_3$ and $MBA_4$ may be adjusted to arrive at new maximum buffer allocations $MBA_3$ and $MBA_4$ such as in accordance with the method described hereinbelow with reference to FIG. 5.

Figure 5:
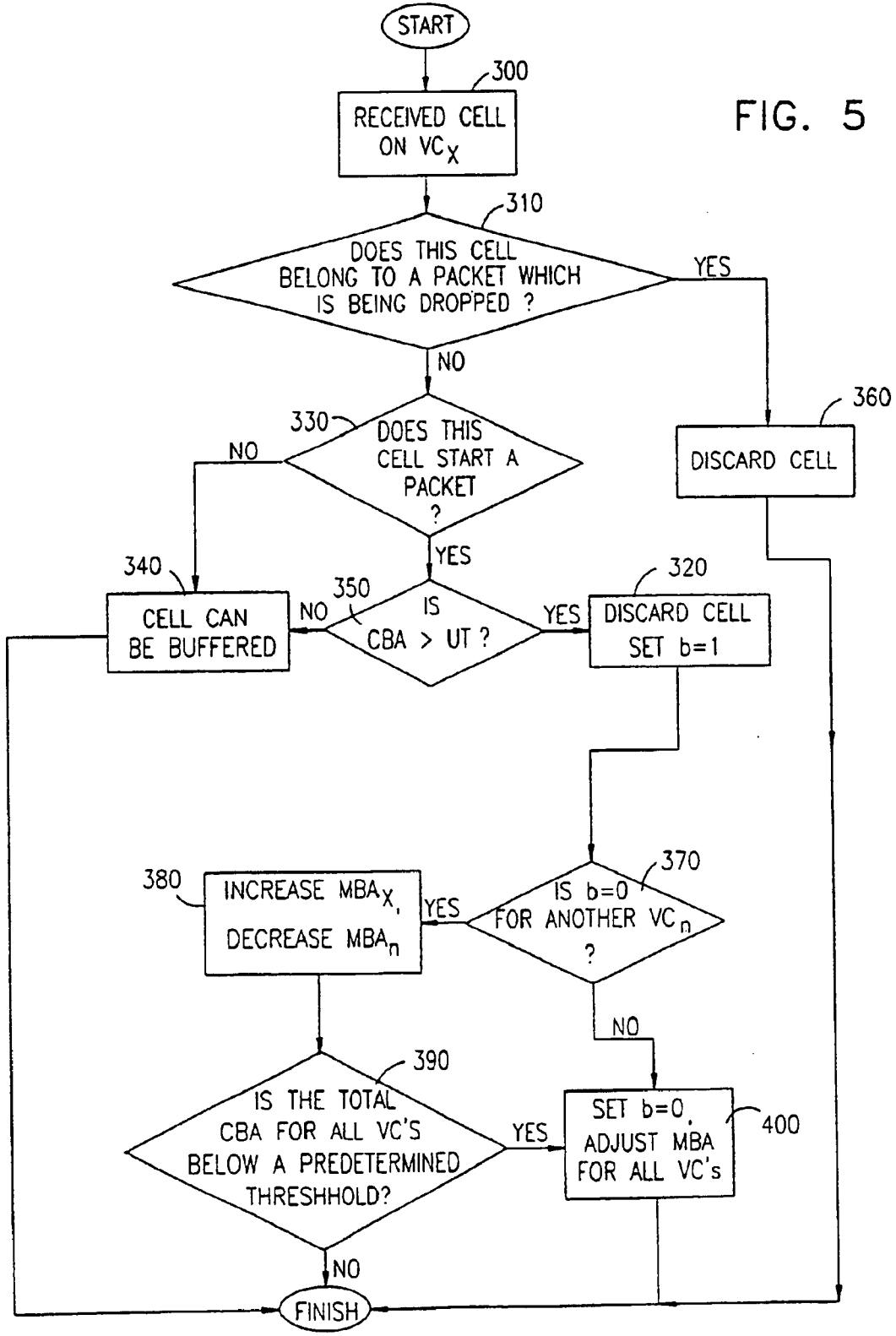
FIG. 5 is a simplified flowchart illustration of a preferred method of managing network congestion at buffer 20 of FIGS. 1 and 4 in accordance with a preferred embodiment of the present invention, and FIGS. 6A and 6B, taken together, are simplified flowchart illustrations of a preferred method of managing network congestion at buffer 20 of FIGS. 1 and 2 in accordance with another preferred embodiment of the present invention.

Reference is now additionally made to FIG. 5 which is a simplified flowchart illustration of a preferred method of managing network congestion at buffer 20 of FIGS. 1 and 4 in accordance with a preferred embodiment of the present invention. In the method of FIG. 5, as in the method of FIG. 3 hereinabove, a rejection indicator "b" is typically maintained for all virtual circuits, such as $VC_3$ and $VC_4$, and is used to indicate the packet rejection status for each virtual circuit. A cell is received for a virtual circuit $VC_x$, typically as part of a TCP packet received at switch 10 (step 300). If the cell belongs to a corrupted packet or to a packet that is being dropped (step 310) then the cell is discarded (step 360). If the cell does not belong to a corrupted packet or to a packet that is being dropped the cell is checked to see if it starts a new packet (step 330). If the cell does not start a new packet, then it may be buffered (step 340). If the cell starts a new packet, the CBA of $VC_x$ is checked against the UT of $VC_x$ (step 350). If CBA>=UT then the cell is discarded, and b is set to b=1 for $VC_x$ if it has not already been set 5 (step 320). If CBA<UT then the cell may be buffered (step 340). After step 320, if b=0 for any other $VC_n$ (step 370) then the MBA for $VC_x$ may be increased, typically in relation to decreasing the MBA of each $VC_n$ where b=0 (step 380). If the total CBA for all VC's exceeds a predetermined threshold (step 390), or if b=1 for every $VC_n$ (step 370), then b may be reset to b=0 for all VC's, and their MBAs may also be adjusted, typically equally or otherwise to predetermined reset levels (step 400).

Figure 6A:
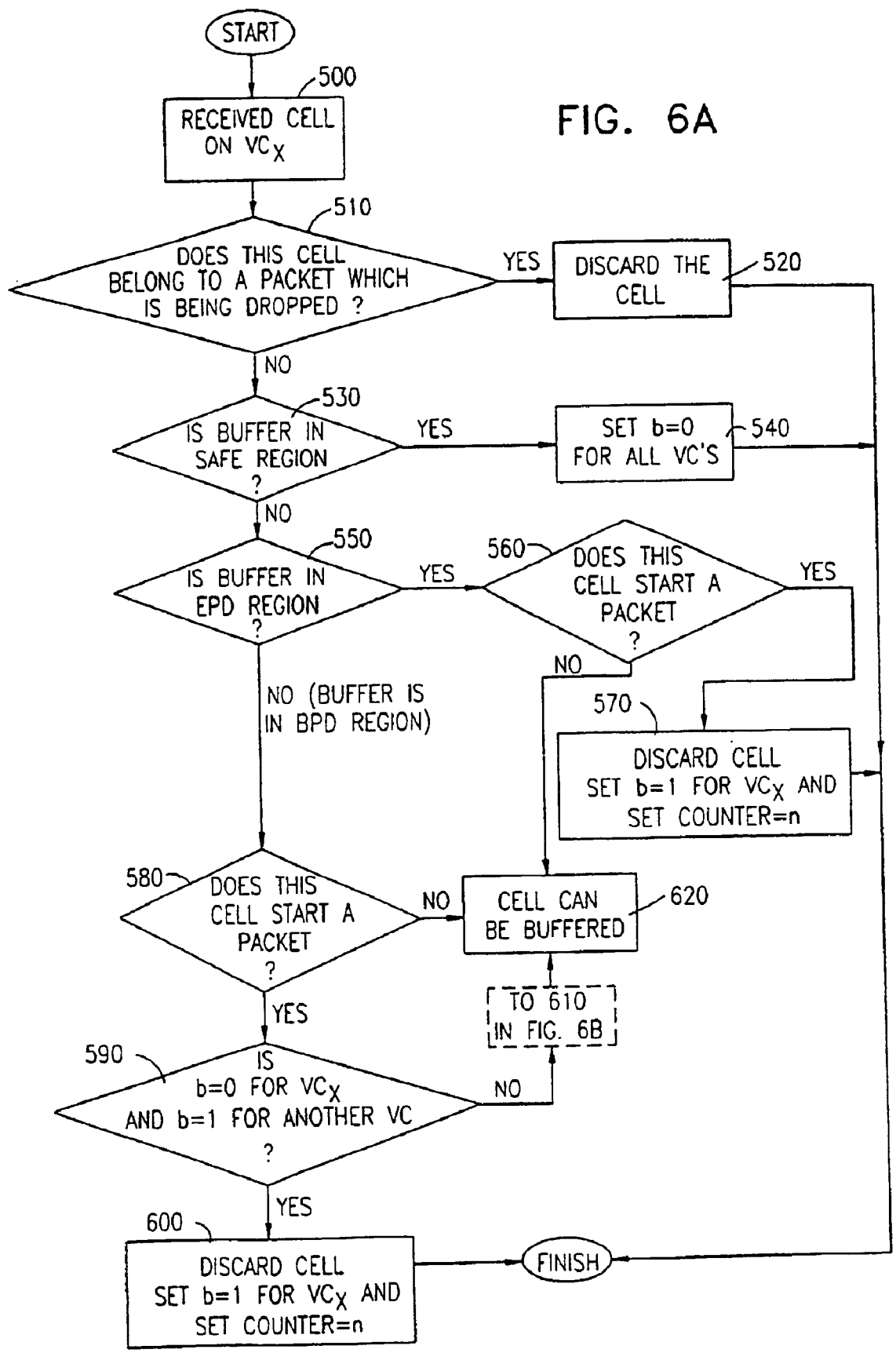
Figure 6B:
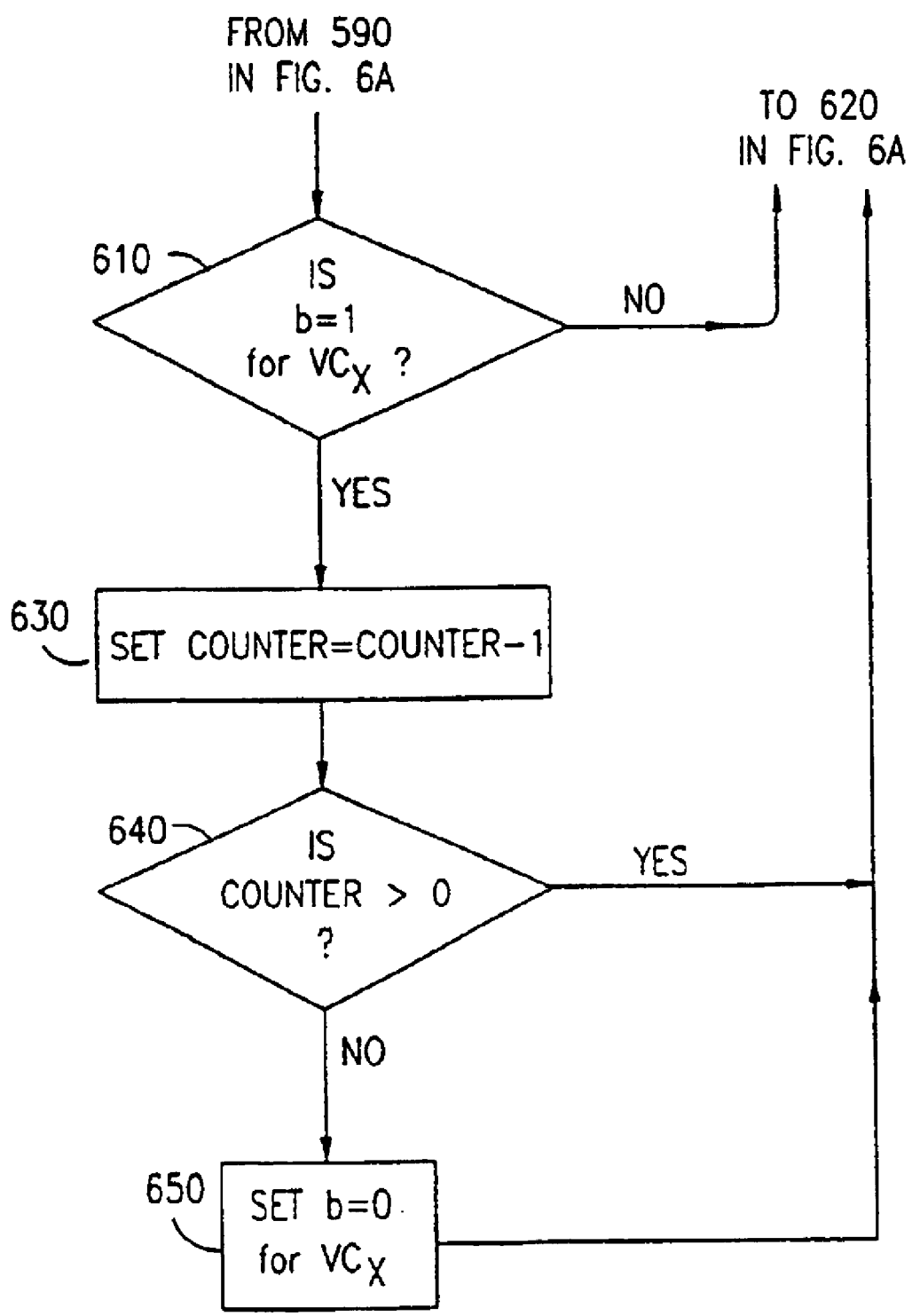

Reference is now additionally made to FIGS. 6A and 6B which, taken together, are simplified flowchart illustrations of a preferred method of managing network congestion at buffer 20 of FIGS. 1 and 2 constructed and operative in accordance with another preferred embodiment of the present invention. Steps 300–600 correspond almost identically to steps 100 15–200 of FIG. 3 except as is now noted. In steps 570 and 600, in addition to discarding the cell and setting b=1 for $VC_x$ as in steps 170 and 200 of FIG. 3, a counter is set for $VC_x$ to a predetermined value n. After step 590, the rejection indicator 'b' is checked for virtual circuit $VC_x$ (step 610). If b does not equal 1, the cell is buffered (step 620). If b=1, then the counter for $VC_x$ is decremented by 1 (step 630). If the counter is greater than 0 (step 640) then the cell is buffered (step 620). If the counter equals 0, then b is set to 0 for $VC_x$ (step 650) and the cell is buffered (step 620).

It is appreciated that any of the methods described hereinabove may be implemented in computer hardware, computer software, or in any suitable combination thereof using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow.

What is claimed is:

1. A method for managing congestion on a network, the method comprising:
   establishing a buffer threshold bounding a first and a second buffer region;
   maintaining a rejection indicator for each of a plurality of network connections; and
   preventing the buffering of a transmission bound for a first of said plurality of network connections if:
      said buffer threshold is exceeded;
      said rejection indicator of said first of said plurality of network connections indicates that no transmission bound for said first of said plurality of network connections was previously rejected since said threshold last became exceeded; and
      said rejection indicator of any other of said plurality of network connections indicates that a transmission bound for said other of said plurality of network connections was previously rejected since said threshold last became exceeded.

2. A method according to claim 1 and further comprising rejecting said transmission bound for said first of said plurality of network connections.

3. A method according to claim 2 and further comprising setting said rejection indicator of said first of said plurality of network connections to indicate that said transmission bound for said first of said plurality of network connections has been rejected.

4. A method according to claim 1 and further comprising setting any of said rejection indicators to indicate that no transmission has been rejected once said threshold is no longer exceeded.

5. A method for managing congestion on a network, the method comprising:
   maintaining a maximum buffer allocation for each of a plurality of network connections,
   maintaining a rejection indicator for each of said plurality of network connections,
   increasing said maximum buffer allocation for a first of said plurality of network connections, and
   decreasing said maximum buffer allocation for at least a second of said plurality of network connections, wherein said increasing and decreasing occur when:
      said rejection indicator of said first of said plurality of network connections indicates that a transmission bound for said first of said plurality of network connections was previously rejected, and
      said rejection indicator of said second of said plurality of network connections indicates that no transmission bound for said second of said plurality of network connections was previously rejected.

6. A method according to claim 5 wherein an aggregate of said increasing is substantially proportionate to an aggregate of said decreasing.

7. A method according to claim 5 and further comprising:
   establishing a buffer threshold bounding a first and a second buffer region for each of said plurality of network connections;
   maintaining a current buffer allocation for each of said plurality of network connections; and
   performing said increasing and decreasing steps when said current buffer allocation of said first of said plurality of network connections exceeds said buffer threshold of said first of said plurality of network connections.

8. A method according to claim 7 and further comprising rejecting a transmission bound for said first of said plurality of network connections.

9. A method according to claim 8 and further comprising setting said first rejection indicator to indicate that said transmission bound for said first of said plurality of network connections has been rejected.

10. A method according to claim 7 and further comprising setting any of said rejection indicators to indicate that no transmission has been rejected, wherein said resetting occurs when all of said rejection indicators indicate that a transmission has been rejected.

11. Network congestion management apparatus comprising
   a network switch connectable with a plurality of network connections and comprising:
   buffer having a first and a second buffer region;
   a threshold indicator for monitoring a threshold intermediate said first and second buffer regions; and
   a rejection indicator for each of said plurality of network connections;
   wherein said network switch is operative to prevent the buffering of a transmission bound for a first of said plurality of network connections if:
      said threshold indicator indicates that said threshold is exceeded;
      said rejection indicator of said first of said plurality of network connections indicates that no transmission bound for said first of said plurality of network connections was previously rejected since said threshold last became exceeded; and
      said rejection indicator of any other of said plurality of network connections indicates that a transmission bound for said other of said plurality of network connections was previously rejected since said threshold last became exceeded.

12. Network congestion management apparatus according to claim 11 wherein said network switch is further operative to reject said transmission bound for said first of said to plurality of network connections.

13. Network congestion management apparatus according to claim 12 wherein said network switch is further operative to set said rejection indicator of said first of said plurality of network connections to indicate that said transmission bound for said first of said plurality of network connections has been rejected.

14. Network congestion management apparatus according to claim 11 wherein said network switch is further operative to set any of said rejection indicators to indicate that no transmission has been rejected once said threshold is no longer exceeded.

15. Network congestion management apparatus comprising:
   a network switch connectable with a plurality of network connections and comprising:
      a buffer for each of said plurality of network connections, each of said plurality of network connections having a maximum buffer allocation; and
   a rejection indicator for each of said plurality of network connections;
   wherein said network switch is operative to:
   increase said maximum buffer allocation for a first of said plurality of network connections; and
   decrease said maximum buffer allocation for at least a second of said plurality of network connections, wherein said increasing and decreasing occur when:
      said rejection indicator of said first of said plurality of network connections indicates that a transmission bound for said first of said plurality of network connections was previously rejected; and
      said rejection indicator of said second of said plurality of network connections indicates that no transmission bound for said second of said plurality of network connections was previously rejected.

16. Network congestion management apparatus according to claim 15 wherein said network switch is further operative to increase said maximum buffer allocation for said first of said plurality of network connections in a manner that is substantially proportionate to an aggregate decrease of said maximum buffer allocation of said at least second of said plurality of network connections.

17. Network congestion management apparatus according to claim 15 and wherein said network switch further comprises:
   a threshold indicator for monitoring a threshold intermediate a first and a second buffer region for each of said buffers, each of said plurality of network connections having a current buffer allocation; and
   a rejection indicator for each of said plurality of network connections;
   wherein said network switch is additionally operative to adjust any of said maximum buffer allocations when said threshold indicator indicates that said current buffer allocation of said first of said plurality of network connections exceeds said threshold of said first of said plurality of network connections.

18. Network congestion management apparatus according to claim 17 wherein said network switch is additionally operative to reject a transmission bound for said first of said plurality of network connections.

19. Network congestion management apparatus according to claim 18 wherein said network switch is additionally operative to set said first rejection indicator to indicate that said transmission bound for said first of said plurality of network connections has been rejected.

20. Network congestion management apparatus according to claim 17 wherein said network switch is additionally operative to set any of said rejection indicators to indicate that no transmission has been rejected, wherein said resetting occurs when all of said rejection indicators indicate that a transmission has been rejected.

21. A method according to claim 1 wherein said network is a packet-switched network and wherein transmissions therethrough comprise packets.

22. Network congestion management apparatus according to claim 1 wherein said network is a packet-switched network and wherein transmissions therethrough comprise packets.

23. A method according to claim 3 and 15 further comprising:

counting the number of times that transmission buffering is performed for said first of said plurality of network connections subsequent to said setting of said rejection indicator of said first of said plurality of network connections; and setting said rejection indicator of said first of said plurality of network connections to indicate that no transmission has been rejected once said counting equals a predetermined value.

24. Network congestion management apparatus according to claim 12 wherein said network switch is further operative to count the number of times that transmission buffering is performed for said first of said plurality of network connections subsequent to said setting of said rejection indicator of said first of said plurality of network connections and set said rejection indicator of said first of said plurality of network connections to indicate that no transmission has been rejected once said counting equals a predetermined value.

25. A method according to claim 5 wherein said network is a packet-switched network and wherein transmissions therethrough comprise packets.

26. Network congestion management apparatus according to claim 15 wherein said network is a packet-switched network and wherein transmissions therethrough comprise packets.

* * * * *